No. 663,389. Patented Dec. 4, 1900.
C. L. NUTTER.
EYELET HOLE MACHINE.
(Application filed Aug. 3, 1896.)
(No Model.) 7 Sheets—Sheet 1.
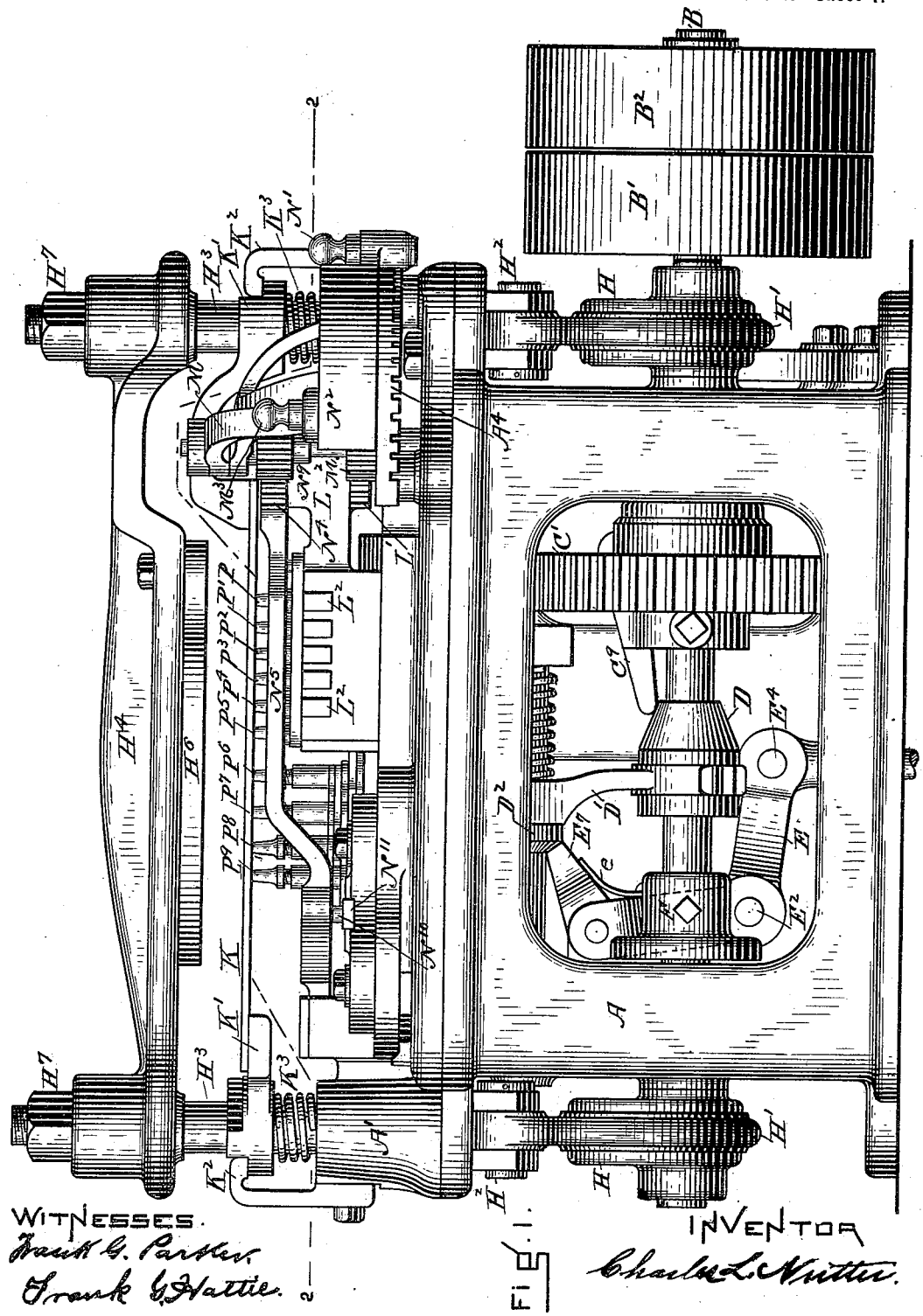
WITNESSES. INVENTOR No. 663,389. Patented Dec. 4, 1900.
C. L. NUTTER.
EYELET HOLE MACHINE.
(Application filed Aug. 3, 1896.)
(No Model.) 7 Sheets—Sheet 2.
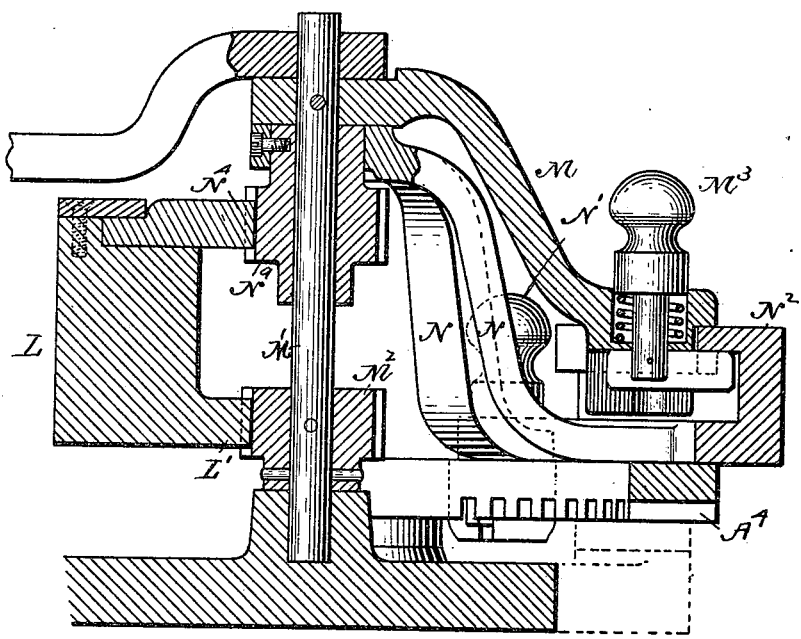
Fig. 1.A
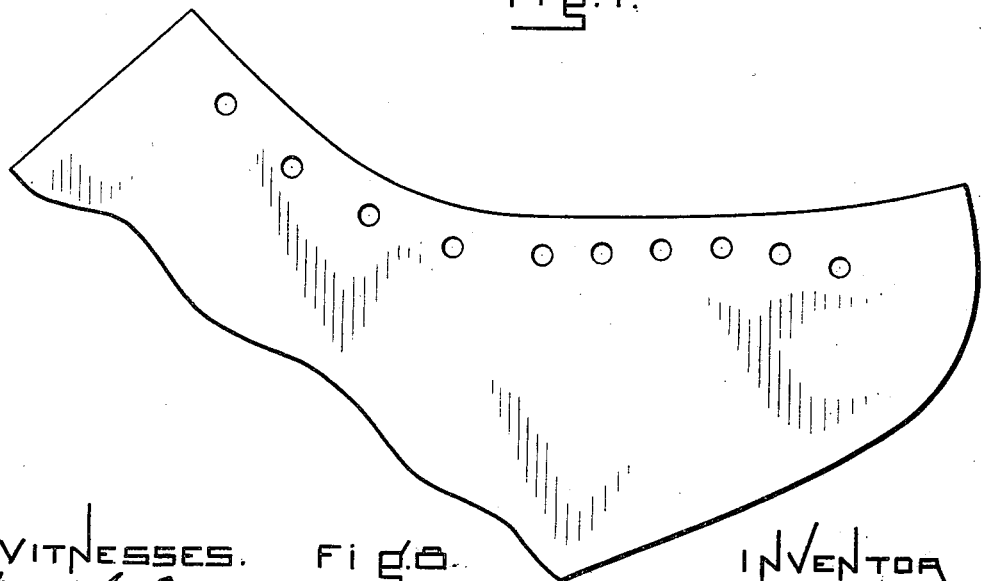
Fig. 8.
WITNESSES. INVENTOR
Frank G. Parker. Charles L. Nutter.
Frank G. Hattie.

No. 663,389. Patented Dec. 4, 1900.
C. L. NUTTER.
EYELET HOLE MACHINE.
(Application filed Aug. 3, 1896.)
(No Model.) 7 Sheets—Sheet 3.
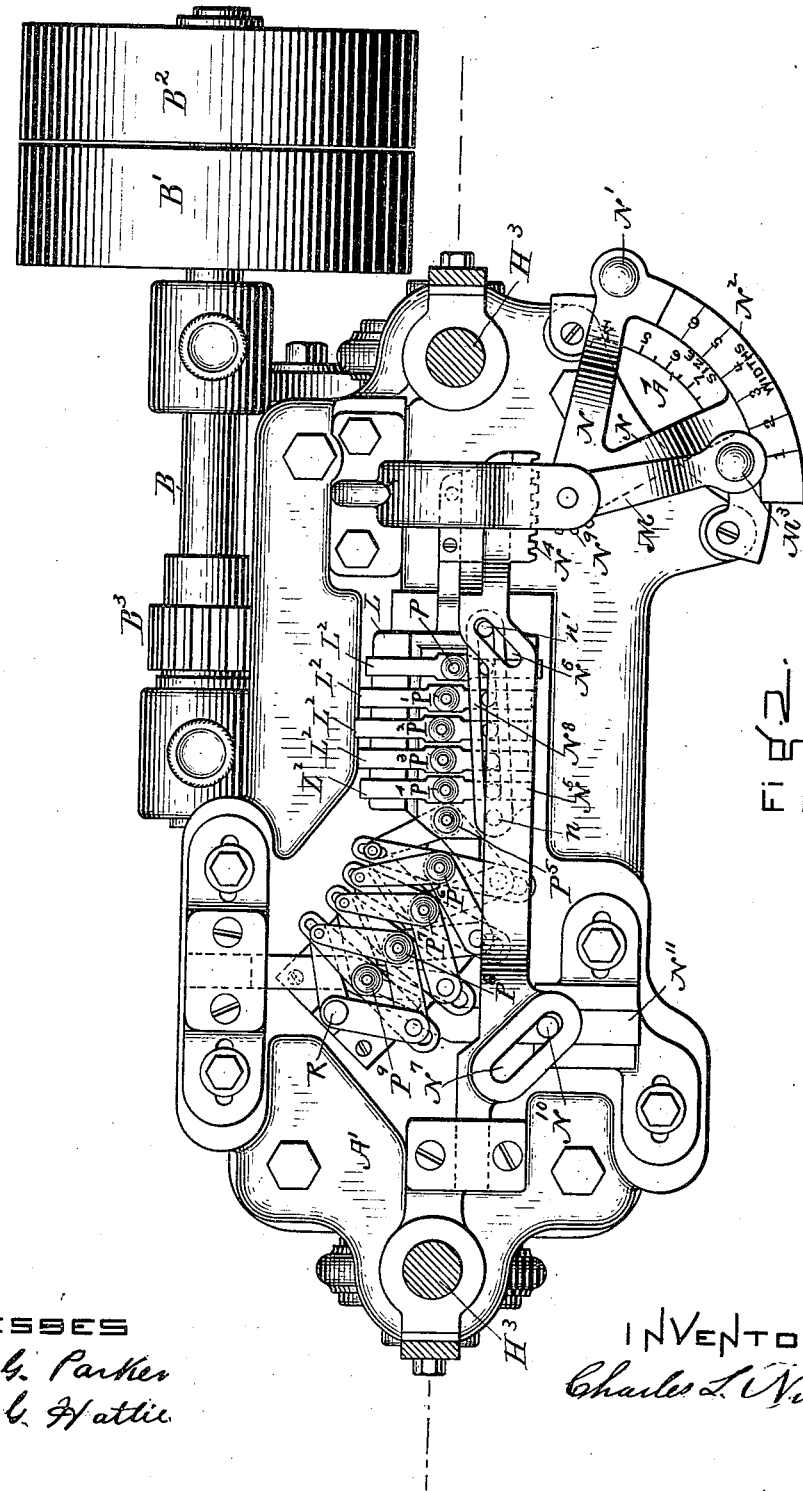
Witnesses
Frank G. Parker
Frank C. Hattie
Inventor
Charles L. Nutter

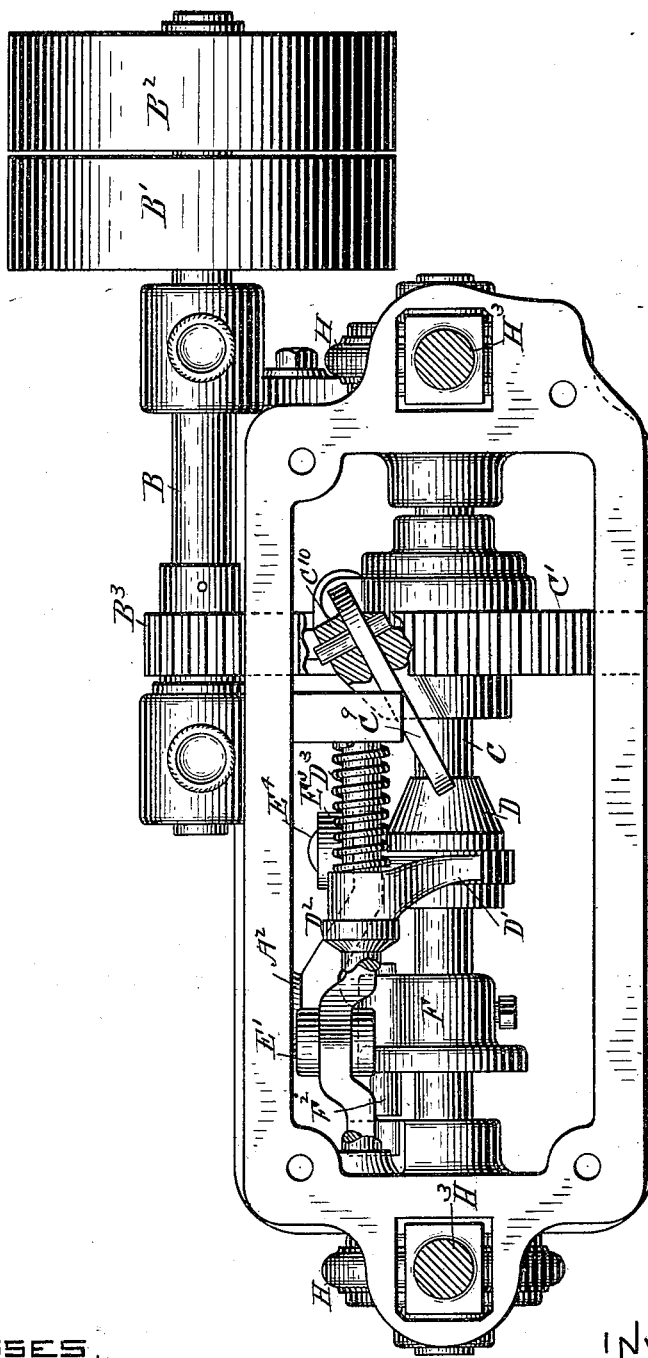

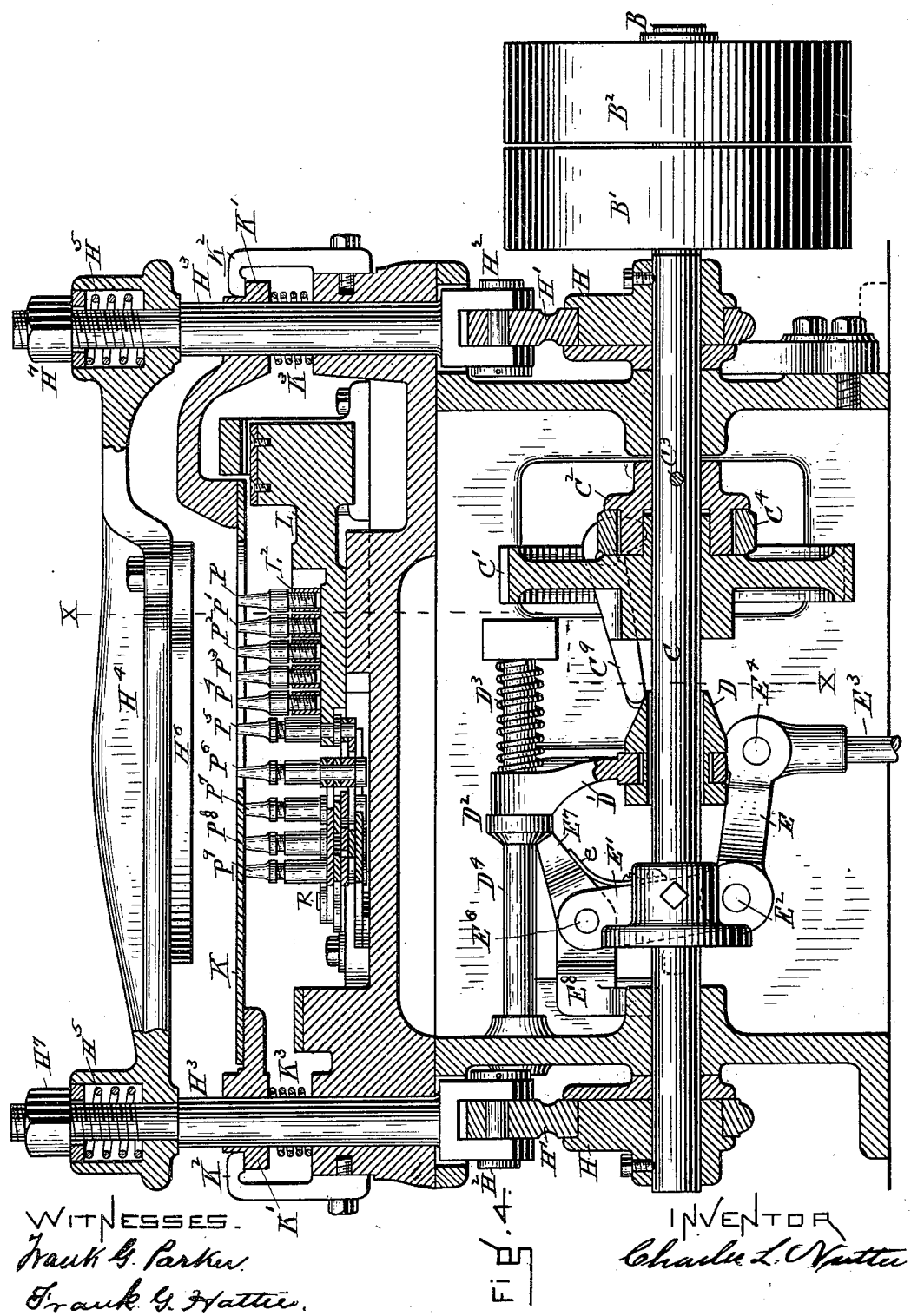

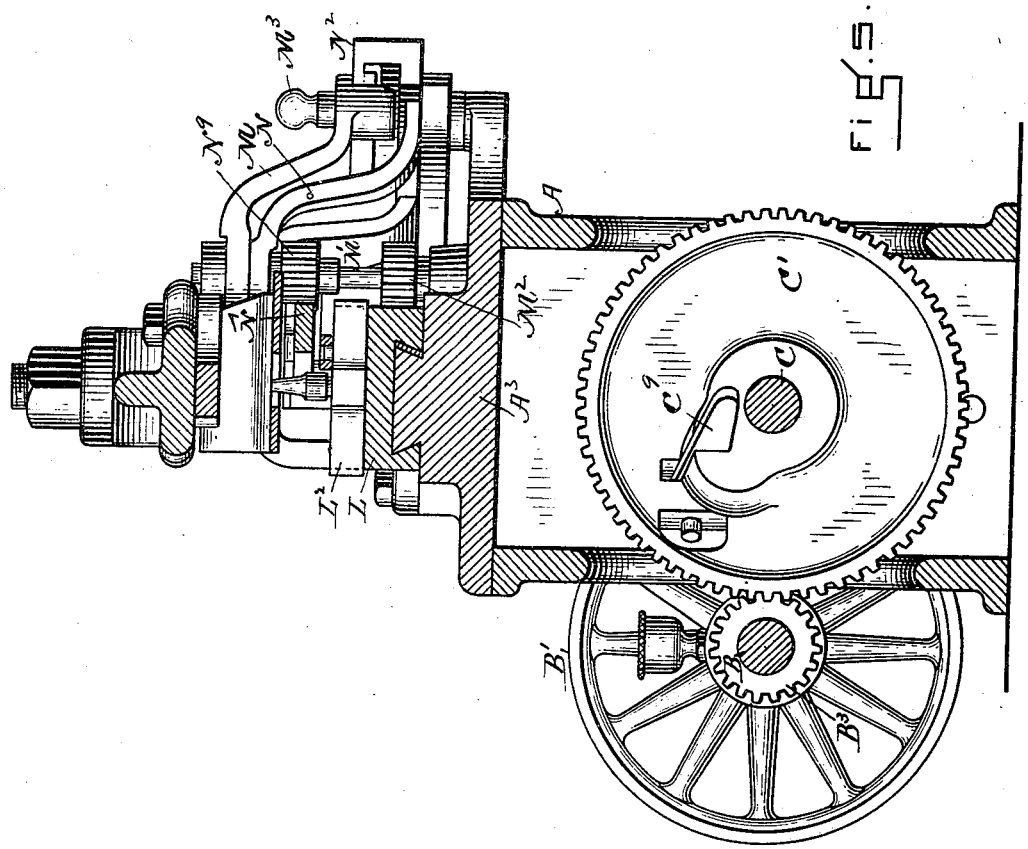

No. 663,389. Patented Dec. 4, 1900.
C. L. NUTTER.
EYELET HOLE MACHINE.
(Application filed Aug. 3, 1896.)
(No Model.) 7 Sheets—Sheet 7.

WITNESSES
Frank G. Parker.
Frank G. Hattie.

INVENTOR
Charles L. Nutter

UNITED STATES PATENT OFFICE.

CHARLES L. NUTTER, OF EAST BRIDGEWATER, MASSACHUSETTS.

EYELET-HOLE MACHINE.

SPECIFICATION forming part of Letters Patent No. 663,389, dated December 4, 1900.

Application filed August 3, 1896. Serial No. 601,548. (No model.)

*To all whom it may concern:*

Be it known that I, CHARLES L. NUTTER, of East Bridgewater, in the county of Plymouth and State of Massachusetts, have invented a new and useful Improvement in Eyelet-Hole Machines, of which the following, taken in connection with the accompanying drawings, is a specification.

My invention relates to a machine for punching eyelet-holes; and it consists in combining with a series of punching-dies and a mechanism for working the same a device for simultaneously adjusting the said punching-dies in relation to their distance apart and also to their alinement, the object being to make a machine that will be quick in its action and in which the punching-dies can be simultaneously adjusted in relation to each other. These objects I attain by the mechanism shown in the accompanying drawings, in which—

Figure 7:
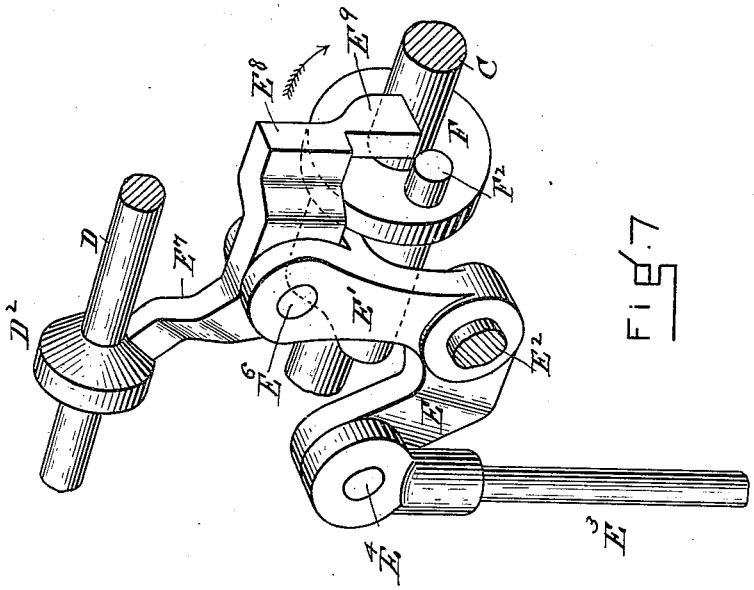
Figure 6:
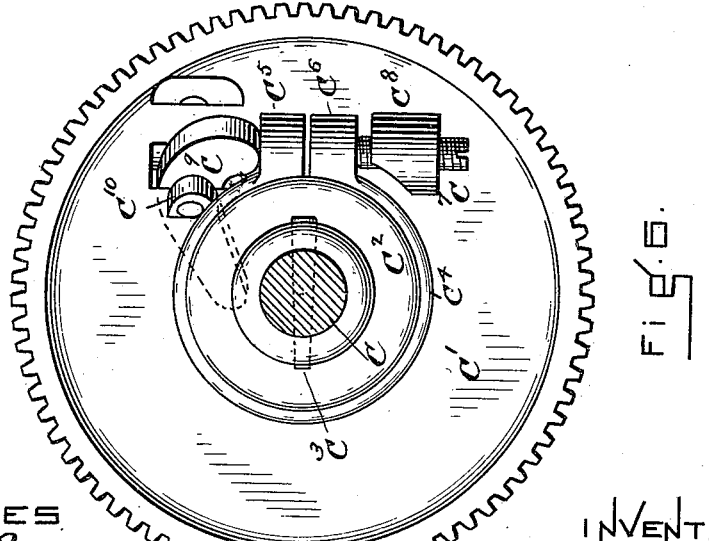

Figure 1 is a front elevation showing my machine. Fig. 1$^A$ shows in section certain details relating to the die-adjusting device. Fig. 2 shows my machine in plan. Fig. 3 shows in plan the lower parts of my machine, the upper part being removed. Fig. 4 is a vertical longitudinal section of my machine. Fig. 5 is a vertical cross-section of my machine, taken on line $x\ x$ of Fig. 4. Figs. 6 and 7 illustrate certain details. Fig. 8 shows in plan a part of the vamp of a shoe with one arrangement of eyelet-holes.

In the drawings, A A' A$^2$, &c., represent the frame of the machine, and B the power-shaft, upon which are mounted the fast and loose pulleys B' B$^2$. A pinion B$^3$ on the power-shaft B engages with a gear-wheel C', loosely mounted on the main shaft C. (See Figs. 3 and 5.) The gear-wheel C' is mounted loosely upon the shaft C, but is connected to it by a friction-clutch device, Figs. 3, 4, and 6, in such a manner that the gear-wheel will cause the shaft C to turn and operate the punching-dies when it is desired. The motion imparted to the shaft C is never absolutely positive, but is simply caused by the friction of the clutch device, so that although the friction-clutch is in working condition the shaft C may be abruptly stopped, as will be explained.

The punching-dies P P$^9$ are arranged as shown and are adapted to remain stationary while doing work. The stock to be punched is placed on the yielding table K, Fig. 4. This table is connected to end pieces K' K' and is supported on springs K$^3$ K$^3$ and held laterally by the uprights H$^3$ H$^3$. Its upward motion is limited by the hooked pieces K$^2$ K$^2$. Openings are made in the table K, so that in its descent it will clear the punching-dies P P$^9$. The punching operation is as follows: The stock to be punched is placed on the table K. Now as the shaft C is made to rotate the eccentrics H H at the ends of the shaft will act through their eccentric-straps H' H' and draw down the uprights H$^3$ H$^3$, to which they are connected by the pins H$^2$ H$^2$, and as the uprights H$^3$ H$^3$ are connected to the cross-head H$^4$ by screw-nuts H$^7$ H$^7$ and springs H$^5$ H$^5$ it is apparent that the follower H$^6$ will be pressed downward upon the stock and force it upon the punching-dies P P$^9$, thus making the desired eyelet-holes in the stock.

I will now describe my clutch and stop device.

The gear-wheel C' is mounted loosely upon the shaft C and is provided with a friction-strap C$^4$ C$^5$ C$^6$, which is fitted to and adapted to act with the friction-collar C$^2$, the said friction-collar being rigidly attached to the shaft C by a pin C$^3$, Figs. 4 and 6. The friction-strap C$^4$ is drawn together so as to act by means of the cam-lever C$^9$, which is pivoted to an ear C$^{10}$, extending from the face of the wheel C'. The lower branch of the friction-strap is adjustably held by the set-screw C$^7$, which is held by the boss C$^8$ on the face of the wheel C'. The cam-lever C$^9$ is operated by the sliding cone D on the shaft C, Figs. 3 and 4. The cone is caused to move forth and back by the arm D' on the sliding rod D$^4$ and is reacted upon by the spring D$^3$. The arm D' rests against the collar D$^2$, so that when the said collar is forced back the arm is also caused to move, and its motion is imparted to the cone D and cam-lever C$^9$, which in turn tightens the friction-strap C$^4$ C$^5$ C$^6$ about the collar C$^2$ and causes the shaft C to rotate. Motion is given to the arm D' by the following described device: E$^3$, Figs. 4 and 7, is a link connected to a foot-treadle. (Not shown.) This link is connected by a pivot E$^4$ to a bent lever E E'. The bent lever is pivoted to a part $A^2$ of the frame (see Fig. 3) by the pin $E^2$, Fig. 7, and has pivotally attached to its upper arm by a pin $E^6$ a dog $E^7$ $E^8$ $E^9$. Said dog is held in its normal position by a spring $e$, Fig. 4, and will not be moved out of place by the swinging motion of the bent lever E E'. The member $E^7$ of the dog serves to push the arm D', and thus give motion to the cone D and its connected parts, as described.

The dog $E^7$ $E^8$ $E^9$ besides acting to close the clutch friction-ring also acts as a stop, which action will now be explained.

F is a disk made fast to the shaft C and is provided with a pin $F^2$. (Shown in Figs. 3 and 7.) This pin $F^2$ is so placed in relation to the eccentrics H H and the part $E^9$ of the dog that when the eccentrics have taken the cross-head $H^4$ to its highest position then the contact between the pin and the stop $E^9$ will take place and the machine will stop (the cross-head being at rest) at its highest place, so that the user may take out the stock that has been punched and put in a new piece. The movement of the dog by the treadle causes the cone D to advance and to put the clutch in action so as to start the machine. This same movement brings the part $E^9$ into the path of motion of the stop-pin $F^2$, so that although the clutch device is in working condition, yet the stop-pin will come in contact with the stop part $E^9$, and the movement of the shaft C, and consequently the cross-head $H^4$, will be abruptly checked. It is of course desirable that the operator shall release the foot-treadle, so as to throw off the clutch as soon as possible after the desired movement of the cross-head has taken place; otherwise the clutch device will have a tendency to strain the parts that cause the movements.

It is essential that the punching-dies when arranged in gangs, as in my machine, shall be adjustable as to distance apart and to alinement. To accomplish this purpose, I have the following-described mechanism: The dies P $P^9$, Figs. 1, 2, and 4, (ten in this case,) are mounted as follows: Five of them, P P' $P^2$ $P^3$ $P^4$, are attached to slides $L^2$ $L^2$, which are adapted to move longitudinally in grooves made in the block L. This block L has a movement in the direction of the length of the machine. The movement of the block is effected by means of the gear $M^2$ engaging with a rack L' on the piece L. The gear $M^2$ is mounted on a shaft M', (see Fig. 5,) said shaft M' being connected to the arm M, so as to move with it. Therefore any motion given to the arm M will be transmitted to the block L and through the slides $L^2$ to the five punching-dies P P' $P^2$ $P^3$ $P^4$ and also to the die $P^5$, which is attached directly to the block L. The pin $M^3$ slides up and down and has a detent which engages with a series of teeth made on the inner and under side of the arc $N^2$. (See Figs. 2 and $1^A$.) By this device the series of punching-dies P $P^5$ may be moved altogether in the line of the direction of the length of the machine. To move these dies laterally, I have in each of the slides $L^2$ $L^2$ (see Fig. 2) a pin, which engages with a slot made in the link $N^8$. This link $N^8$ is pivotally attached to the block L by the pin $n$, and has a pin $n'$, which engages with a slot $N^6$, made in the sliding bar $N^5$. This sliding bar $N^5$ has a rack $N^4$, which engages with a pinion $N^9$, attached to the swinging segment N N $N^2$, so that in moving the said segment the sliding bar is moved, causing a movement of the link $N^5$ and through the slides $L^2$ $L^2$ imparts a lateral movement to the punching-dies. The pin N' has a detent on it which engages with notches made on the under side of the fixed segment-piece $A^4$, Figs. 1 and 2. The four punching-dies $P^6$ $P^7$ $P^8$ $P^9$ are attached to the central joints of a "lazy-tongs." (See Figs. 1 and 2.) One end of the lazy-tongs is fastened at $P^5$ to the sliding piece L, and the other end to the frame of the machine by the pin R, so that the dies mounted on the lazy-tongs will all move more or less with the block L. A side movement is given to the dies on the lazy-tongs by the sliding bar $N^{11}$, which is connected to the lazy-tongs at $P^9$. This sliding bar $N^{11}$ has a pin $N^{10}$, which engages with a slot $N^7$, made in the sliding bar $N^5$, so that any motion given to the bar $N^5$ will be transmitted to the bar $N^{11}$ and through the lazy-tongs to the dies $P^6$ $P^7$ $P^8$ $P^9$.

To adjust my machine for operation the user proceeds as follows: To adjust for size (or length)—the size four, for instance—the arm M is set so that the pin $M^3$ is opposite the number "4" (indicated by dots) on the arc $A^4$, Fig. 2. This action will force the block L to the left, thus causing the punching-dies P $P^9$ to come together, as required for punching the smallest size upper. To adjust for width—one, for instance—the segment N N $N^2$ is turned so as to have its pin N' stand opposite the mark "1" on the arc $N^2$. This action will cause the sliding bar $N^5$ to draw the pins $n'$ $N^{10}$ forward, thus drawing the dies to the position required for punching the narrowest size. By placing the pins N' and $M^3$ in other positions—that is, opposite other numbers on the arcs $A^4$ and $N^2$—any adjustment may be attained.

I claim—

1. In a machine of the character described, the combination, with a set of punches, of means for adjusting the punches to vary their line of curvature and simultaneously therewith adjusting them toward or from each other, and further means for adjusting said punches toward or from each other independently of the means first named.

2. In a machine of the character described, the combination with punches, of means for adjusting said punches in a line having a contour differing from an arc of a circle and simultaneously therewith adjusting them toward or from each other.

3. In a machine of the character described, the combination with punches, of means for simultaneously adjusting them in a sinuous line.

4. In a machine of the character described, the combination with a set of punches, of means for adjusting said punches to vary their line of curvature and simultaneously therewith adjust them toward or from each other.

5. In a punching-machine of this class a series of punching-dies, lazy-tongs having mounted upon them the said series of punching-dies, a sliding block L, having punch-carrying slides adapted to move laterally in said block, a sliding bar $N^5$, adapted to operate the said punch-carrying slides, and mechanism adapted to adjustably operate said sliding block and bar, substantially as and for the purpose set forth.

In testimony whereof I have signed my name to this specification, in the presence of two subscribing witnesses, on this 20th day of July, A. D 1896.

CHARLES L. NUTTER.

Witnesses:
FRANK G. PARKER,
FRANK G. HATTIE.